May 26, 1970 T. R. NEILL 3,514,379

ELECTRODEPOSITION OF METALS ON SELECTED AREAS OF A BASE

Filed April 4, 1967 3 Sheets-Sheet 1

INVENTOR.
TREVOR ROSS NEILL
BY
Frank R. Trifari
AGENT

May 26, 1970 T. R. NEILL 3,514,379

ELECTRODEPOSITION OF METALS ON SELECTED AREAS OF A BASE

Filed April 4, 1967 3 Sheets-Sheet 2

INVENTOR.
TREVOR ROSS NEILL
BY
[signature]
AGENT

May 26, 1970 T. R. NEILL 3,514,379

ELECTRODEPOSITION OF METALS ON SELECTED AREAS OF A BASE

Filed April 4, 1967 3 Sheets-Sheet 3

INVENTOR.
TREVOR ROSS NEILL
BY
Frank R. Jurfari
AGENT

United States Patent Office 3,514,379

Patented May 26, 1970

3,514,379

ELECTRODEPOSITION OF METALS ON SELECTED AREAS OF A BASE

Trevor Ross Neill, North Wembley, England, assignor, by mesne assignments, to U.S. Philips Corporation, New York, N.Y., a corporation of Delaware Filed Apr. 4, 1967, Ser. No. 628,492
Claims priority, application Great Britain, Apr. 7, 1966, 15,610/66
Int. Cl. C23b *5/60, 5/66*
U.S. Cl. 204—15 5 Claims

ABSTRACT OF THE DISCLOSURE

Method of electrodepositing metal on selected areas of a base by electrodepositing on the base in those areas upon which no deposit of the metal is desired a non-plateable metal upon which the first mentioned metal cannot be electrodeposited and then removing the non-plateable metal from the base. Gold may be electrodeposited in selected areas by use of titanium as the non-plateable metal. This abstract is not intended to describe the invention as defined by the claims.

Figures 1, 2:
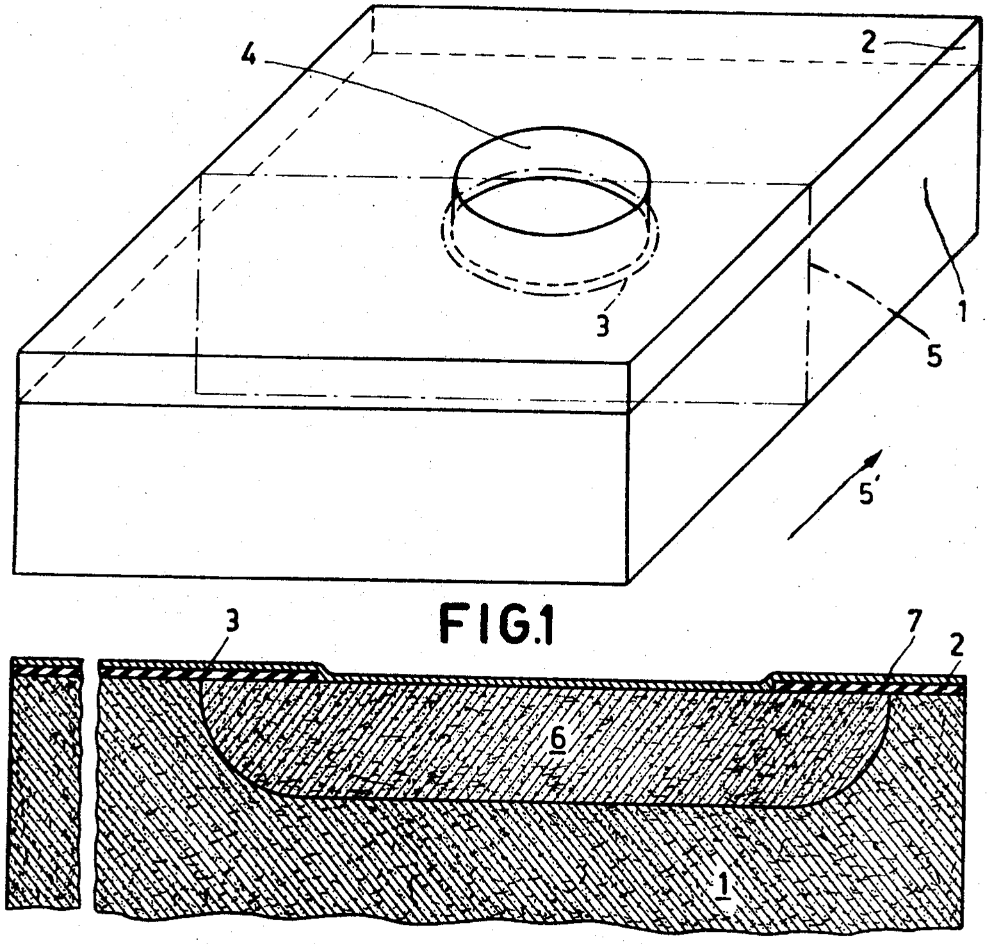

This invention relates to the electrodeposition of metals on metal base layers which may be used to form electrical connections in electronic devices.

In the production of electronic devices, for example semiconductor devices which may be in the form of an integrated circuit on a semiconducting substrate or on an insulating substrate, it is necessary to provide electrical connection between discrete active or passive components in the circuit and conections between the circuit and external components.

It is known to form a thin conducting layer between electrodes of components, for example, by vacuum deposition and then electrodepositing further conductive material onto the layer in the form of stripes connecting the electrodes. Electrodeposition onto the required area of the stripes is realised by masking the areas where deposition is not required by a resist coating. The resist coating may be in the form of a photoresist which allows stripe shaped apertures to be formed in the coating by optical techniques. However the use of a photoresist layer alone has certain disadvantages, in particular when used for the formation of an integrated circuit which normally has a high concentration of components in an area. Flaws, for example, pinholes in the photoresist coating can result in parasitic deposits of the electrodeposited layer on the subjacent conducting layer, and the parasitic deposits formed may be of such magnitude as to form short-circuiting bridges on the high density component pattern.

The resist coating has a good adherence to the conducting layer for the normal procedures in which it is used but may lift at the edge of the areas where electrodeposition is made and so allow the area to become larger than originally defined; the evolution of gas may assist in this enlargement of the originally defined area. It has also been found that good dimensional accuracy is not always obtainable using a photoresist layer and it will be appreciated that good dimensional accuracy and electrodeposition only within the intended areas is a necessary property of any process for forming connections in an integrated circuit.

The object of the invention is to provide an improved method for the electrodeposition of metals onto a selected area of a conductive layer.

During the investigations which led to the present invention, it was found necessary to mask the areas of the metal base layer on which electrodeposition of metal was to be prevented by means of a composite mask formed by a layer of an upplateable metal covered by a photoresist layer. Throughout this specification, the term "unplateable metal" is understood to mean a metal on which it is not possible to produce firmly adherent electrodeposits of easily electroplateable metals, for example, copper, nickel, silver and gold, unless this metal has been given special pretreatment before electrodeposition of the electroplateable metal.

The present invention provides a method of electrodepositing metal upon a selected area of a metal base layer comprising the steps of: (A) forming a layer of an unplateable metal on the metal base layer; (B) applying a layer of a photoresist lacquer onto the layer of unplateable metal; (C) removing the photoresist and unplateable metal from above selected areas of the metal base layer; (D) electrodepositing the metal onto the selected area of the metal base layer; (E) removing the remaining portions of the photoresist and of the unplateable metal layers.

The use of an unplateable metal as part of the plating mask prevents the electrodeposition of metal outside the selected area of the metal base layer which might occur when a normal thickness photoresist layer above was used to form the mask and when the photoresist lifted at the boundaries of the seletced area and also through flaws such as pinholes which may occur in a photoresist layer.

The unplateable metal must adhere firmly to the metal base layer, but must not form an alloy with the metal base layer to any significant extent at the temperatures to which the metal base layer is heated when coated with the unplateable metal, for example, the temperature at which the substrate is maintained during vacuum deposition of the unplateable metal. The unplateable metal surface which is remote from the metal base layer is covered with a superficial oxide layer, and it is essential that the unplateable metal can be chemically etched in both the pure and oxidised states.

Preferably the unplateable metal is one of the metals molybdenum, chromium and aluminium. Titanium may be used as the unplateable metal for the electrodeposition of gold. Tantalum and niobium may also be used.

Figure 4:
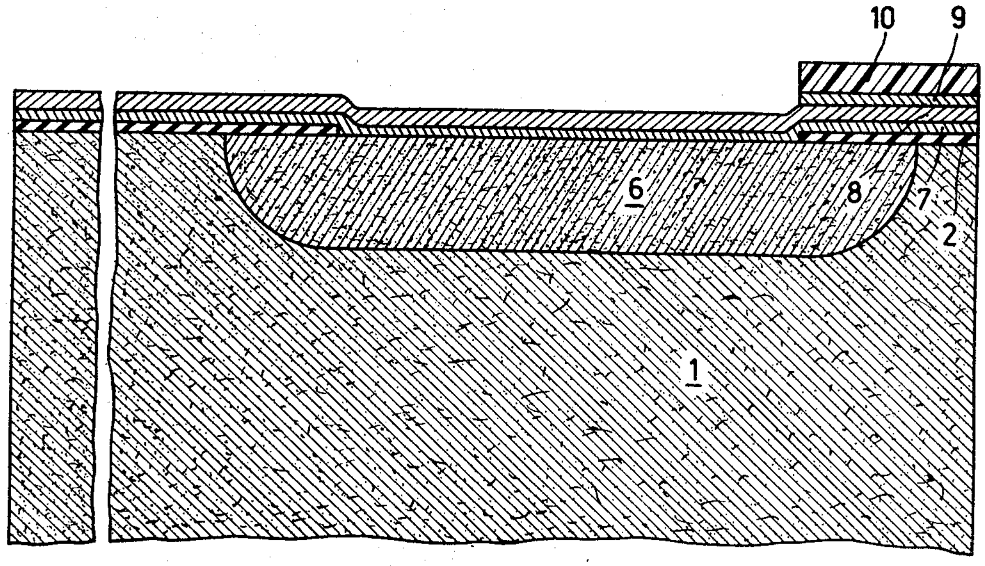
Figure 5:
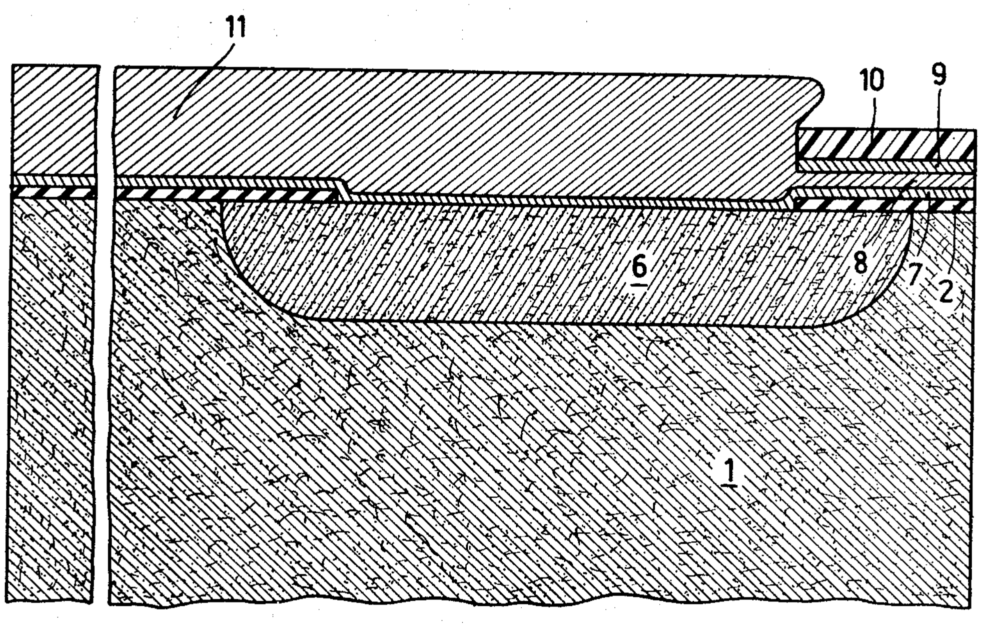
Figures 6, 7, 8:
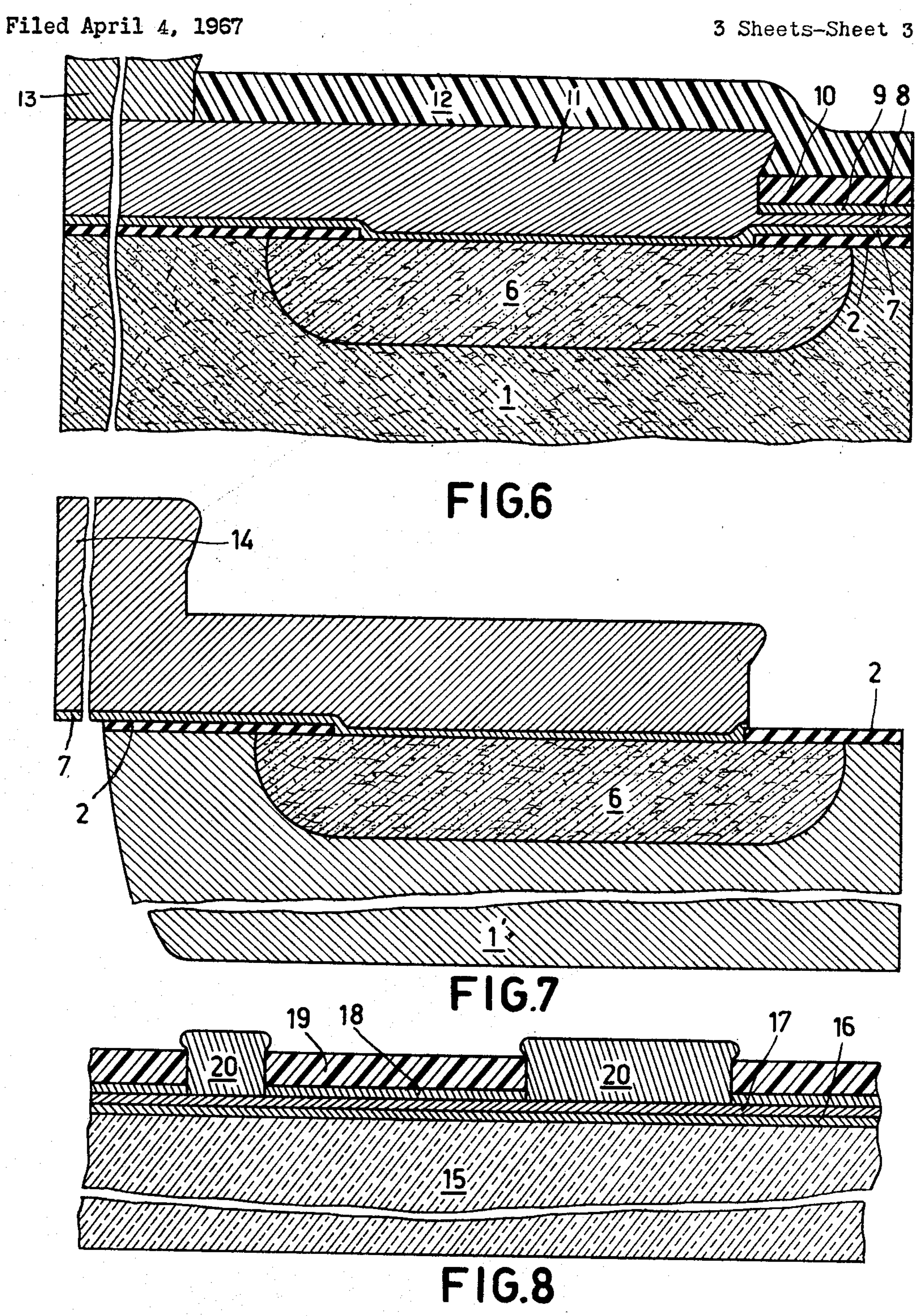

Two embodiments of the method according to the present invention will now be described with reference to the accompanying diagrammatic drawings in which FIG. 1 shows a perspective view of a body to which an electrical connection is required, FIGS. 2 to 7 inclusive show side elevations of sections of the body at diferent stages in the fabrication of an electrical connection to the body and FIG. 8 shows a side elevation of a section of a metal pattern on a substrate.

EXAMPLE 1

Referring to FIG. 1, a monocrystalline silicon body 1 of one conductivity type has a layer 2 of silicon dioxide grown on a plane surface. Adjacent to this surface is a surface region of the opposite conductivity type forming an area on the surface enclosed by the PN junction 3 shown as a dot-and-chain line. The oxide layer 2 has an aperture 4 in it which exposes a part of the surface region within the PN junction. The method to be described allows an electrical connection to be made to the area of the surface region exposed in the aperture 4. FIGS. 2 to 7 are side elevations viewed in the direction of the arrow 5' in FIG. 1 of sections in the plane 5 which is shown by a dot-and-chain line.

(i) A layer 7 of molybdenum 2,500 A. thick was vacuum deposited at a pressure of $1\times10^{-5}$ torr over the whole of the surface of the body 1 so as to cover the oxide layer 2 and the exposed surface of region 6 in the aperture 4. The body 1 was held at a temperature of 250° C. during the vacuum deposition. FIG. 2 shows the layer geometry after the molybdenum layer 7 had been deposited.

It was found that ohmic contacts could be made to N+ diffused region (containing a surface concentration of phosphorus of $10^{20}$ atoms per sp. cm.) and P-type diffused regions (containing a surface concentration of boron of $5\times10^{18}$ atoms per sq. cm.) with a body temperature of 250° C. during the deposition. However it will be appreciated that the body temperature during vacuum deposition may have to be altered to obtain ohmic contacts with other materials.

Figure 3:
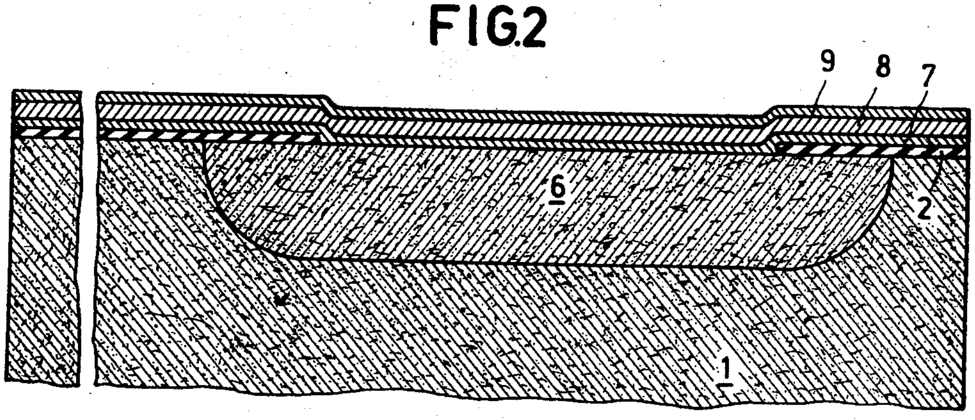

(ii) Layers of gold 8 and molybdenum 9 were then successively vacuum deposited to produce the arrangement shown in FIG. 3. The gold layer 8 was approximately 5000 A. thick and the upper layer 9 of molybdenum which was the layer of unplateable metal was approximately 1500 A. thick. In this case, the gold layer 8 was the metal base layer. Both these vacuum deposition processes were conducted with a substrate temperature of 250° C. and a pressure of $1\times10^{-5}$ torr. The molybdenum layer 9 adhered well to the gold layer 8 but did not form an alloy with the gold to any significant extent during the vapour deposition, since the solubility of molybdenum in gold is low at the temperatures ocurring during this process.

(iii) A layer of Kodak Thin Film Resist 1$\mu$ thick was then deposited on the upper molybdenum layer 9 and exposed through an optical mask and developed using Kodak KMER Resist Developer so that a window was opened in the photoresist over the aperture 4 and extending to one edge of the molybdenum layer 9.

(iv) The exposed part of the layer 9 of molybdenum was then removed by etching using an etchant consisting of:

| | Vol. |
|---|---|
| Nntric acid (70%) | 1 |
| Sulphuric acid (98%) | 1 |
| Water | 5 |

The etching time was very short, it was sufficient to dip the exposed layer in the etchant and wash it immediately in water. The gold layer 8 was then exposed under the window and FIG. 4 shows the arrangement of the layers at this stage.

(v) The assembly was then baker at 130° C. for 10 minutes to reseal the exposed edges of the remaining photoresist layer 10.

(vi) An electrical contact was then made to the gold layer 8 at a convenient point on the layer and a gold layer 11 approximately 5$\mu$ thick was electrodeposited on the gold layer 8 over the selected area where it was not masked by the composite mask formed by the photoresist 10 and the upper molybdenum layer 9. FIG. 5 shows in section the arrangement of the layer at this stage. It will be seen that the layer 10 assisted to prevent the growth of the layer 11 from the selected area over the layer 9 and thus acted as a type of mould.

The plating bath was prepared by dissolving 28.3 gms. of sodium gold cyanide (46% Au) and 100 gms. of diammonium hydrogen citrate in 1 litre of distilled water which was maintained at 65° C. for 4 hours. The pH of the bath was 5.2.

The plating process was carried out with the bath at 65° C. and agitated by means of a nitrogen gas stream which are bubbled through the solution. The current density was 5ma./cm.$^2$ and the rate of deposition of gold was $\frac{1}{4}\mu$ per minute.

(vii) A layer 12 of Kodak Metal Etch Resist approximately 3$\mu$ thick was then applied over the remaining photoresist layer and also over the electrodeposited gold layer 11. At stage, it was unnecessary to use a composite mask consisting of an unplateable metal together with a photoresist layer, since random deposition through the mask onto the gold layer 11 is not important. The photoresist layer 12 was then exposed through a pattern and developed using Kodak KMER Resist Developer, so that part of the electrodeposited gold layer 11 extending in from the edge of the body 1 was exposed, though the exposed part did not extend as far as the edge of the aperture 4. A gold layer 13 approximately 5$\mu$ thick was then electrodeposited using the same bath as was used to form the layer 11. Thus the total thickness of gold over the region 13 was approximately 10$\mu$, and FIG. 6 shows the arrangement at this stage. If desired, this stage of the process may be carried out using only a single photoresist layer, the layer 10 being removed before the layer 12 is applied.

(viii) The photoresist layers 10 and 12 were then removed by immersing in J100 (manufactured by Indust-Ri-Chem Laboratory) at 100° C., followed by washing with carbon tetrachloride and finally acetone. The remaining part of the molybdenum layer 9 was then removed using the etchant used in step (iv) above.

(ix) The part of the gold layer 8 which extended between the selected areas on which electrodeposition occured and which was in contact with the upper molybdenum layer 9 was then removed with a rapid etch formed by an aqueous solution containing 15% by weight of potassium iodide and 5% by weight of iodine. This part of the gold layer had served to provide the necessary electrical connection for the electrodeposition steps.

(x) The area of the molybdenum layer 7 exposed outside the area of electrodeposited gold was then removed using the etchant used in step (iv) above. The silicon dioxide layer 2 was thus exposed except where gold layers 13 and 11 had been deposited.

(xi) The whole arrangement was then mounted onto a thin silica disc with the electrodeposited gold layers adjacent to the disc. Part of the silicon body 1 was then etched away using conventional photomasking and etching techniques to give the body 1', which was provided with a lead 14 comprising two electrodeposited gold layers 13 and 11 on a vacuum deposited gold layer 8 which was backed by the molybdenum layer 7. FIG. 7 shows this arrangement in which the lead 14 extends beyond the edge of the semiconductor body 1'.

After removal from the waxed silica disc the body 1' could be supported by the lead 14 which was used to make electrical connection to the surface region 6. The exposed region of the molybdenum layer 7 can be retained if desired or may be removed.

The method can be extended to providing electrical connections to a plurality of surface regions and the method is also not limited the formation of self-supporting leads extending beyond the edges of a semiconductor body. The method described may be used to give interconnection between regions in a semiconductor body, for example, 20$\mu$ wide and 5$\mu$ thick; the lead 14 was 10$\mu$ thick and 100$\mu$ wide. Thus the step of forming the electrodeposite layer 13 may be omitted and a method according to the present used to form electrodeposited thin connections between active or passive electronic devices on or in a single semiconductor substrate.

EXAMPLE 2

A glass substrate 15 was chemically cleaned and a chromium layer 16 5000 A. thick was vacuum deposited at a pressure of $10^{-5}$ torr with the substrate held at 500° C. A layer 17 of gold 5000 A. thick was then vacuum deposited with the substrate held at a temperture of 400° C.

An apertured molybdenum layer 18 having a layer 19 of photoresist on its surface was then formed using the techniques described in steps (ii) to (v) inclusive of Example 1. The aperture or apertures in the molybdenum layer formed a pattern exposing the gold layer 17 onto which a gold layer 20 was electrodeposited using the technique described in step (vi) of Example 1. FIG. 8 shows the arrangement at this stage, the electrodeposited gold layer 20 being 5$\mu$ thick.

The photoresist layer 9, the molybdenum layer 18 and the areas of the gold layer 17 onto which the electrodeposition was not made were removed using the solvents and etchants referred to in Example 1. The areas of the chromium layer 16 exposed by removal of areas of the gold layer 17 were then removed by dipping in a solution of 60% (v./v.) sulphuric acid.

At this stage the glass substrate carries a pattern of gold on one surface, the gold layer being formed by electrodeposition of gold onto selected areas of a thin gold layer.

The conductive pattern may be used to make electrical connection to active and passive thin film devices formed on a surface of an insulating substrate.

While the present invention has been described with particular reference to prefered embodiments thereof, it will be understood that various modifications may be made therein without departing from the scope of the invention.

What is claimed is:

1. A method of electrodepositing metal upon a selected area of a metal base layer comprising the steps of: (A) forming a layer of an unplateable metal on the metal base layer; (B) applying a layer of a photoresist lacquer onto the layer of unplateable metal; (C) removing the photoresist and unplateable metal from above the selected area of the metal base layer; (D) electrodepositing the metal onto the selected area of the metal base layer; (E) removing the remaining portions of the photoresist and unplateable metal layers.

2. The method of claim 1 wherein an electrodeposited metal and the metal of the base layer are the same metal.

3. The method of claim 5 wherein the parts of the metal electrodeposited on the selected area not to be further plated are masked by a masking layer of material which is non-plateable by the deposited metal.

4. The method of claim 3 wherein the masking layer is a layer of photoresist lacquer.

5. The method of claim 1 wherein, prior to the removal of the unplateable metal layer a layer of metal is electrodeposited on at least a portion of the metal electrodeposited on the metal base layer.

References Cited

UNITED STATES PATENTS

| | | | |
|---|---|---|---|
| 3,060,076 | 10/1962 | Robinson ------------ | 204—15 |
| 3,386,894 | 6/1968 | Steppat ------------- | 204—15 |
| 3,388,048 | 6/1968 | Szabo -------------- | 204—38 |
| 3,408,271 | 10/1968 | Reissmueller et al. ---- | 204—15 |

JOHN H. MACK, Primary Examiner

T. TUFARIELLO, Assistant Examiner

PO-1050
(5/69)

UNITED STATES PATENT OFFICE
CERTIFICATE OF CORRECTION

Patent No. 3,514,379 (PHB 31,596) Dated May 26, 1970

Inventor(s) TREVOR ROSS NEILL

It is certified that error appears in the above-identified patent and that said Letters Patent are hereby corrected as shown below:

Column 3, line 38, "Nntric" should read -- Nitric --.

line 72, after "at" insert -- this --.

Column 4, line 56, after "present" insert -- invention --.

Column 5, line 1, "9" should read -- 19 --.

Signed and sealed this 15th day of November 1970.

(SEAL)
Attest:

Edward M. Fletcher, Jr.
Attesting Officer

WILLIAM E. SCHUYLER, JR.
Commissioner of Patents